United States Patent [19]

White

[11] Patent Number: 5,271,603

[45] Date of Patent: Dec. 21, 1993

[54] VEHICLE JACK

[76] Inventor: Michael White, 1644 S. Central Ave., Flagler Beach, Fla. 32136

[21] Appl. No.: 25,088

[22] Filed: Mar. 2, 1993

[51] Int. Cl.⁵ .............................................. B60P 1/48
[52] U.S. Cl. ................................................. 254/10 C
[58] Field of Search ................. 254/10 R, 10 B, 10 C, 254/9 R, 9 B, 9 C, 8 R, 8 B, 8 C, 124, 133, 88

[56] References Cited

U.S. PATENT DOCUMENTS

| | | | |
|---|---|---|---|
| 3,214,136 | 10/1965 | Marks | 254/10 C |
| 4,077,607 | 3/1978 | Lovelady | 254/88 |
| 4,461,456 | 7/1984 | Munna | 254/88 |
| 4,486,006 | 12/1984 | Fawdry | 254/88 |

FOREIGN PATENT DOCUMENTS 502639 12/1954 Italy ................. 254/10 C

*Primary Examiner*—Robert C. Watson
*Attorney, Agent, or Firm*—McAulay Fisher Nissen Goldberg & Kiel

[57] ABSTRACT

A vehicle jack is disclosed having a base and a lifting platform which is connected to the base by pivotally connecting legs. The lifting platform has a pair of spaced-apart side members and a cross beam member extending between and connected to the side members. A hydraulic jack component is mounted to the base and has a lifting member pivotally connected to the lifting platform by a link which is pivotally connected to the cross beam member of the platform. The platform is disposed for movement between a low profile state and an elevated protracted state. A motorcycle is intended to be positioned over the platform when in its low profile state and is raised by movement of the platform to its elevated protracted state upon activation of the hydraulic jack component.

17 Claims, 2 Drawing Sheets

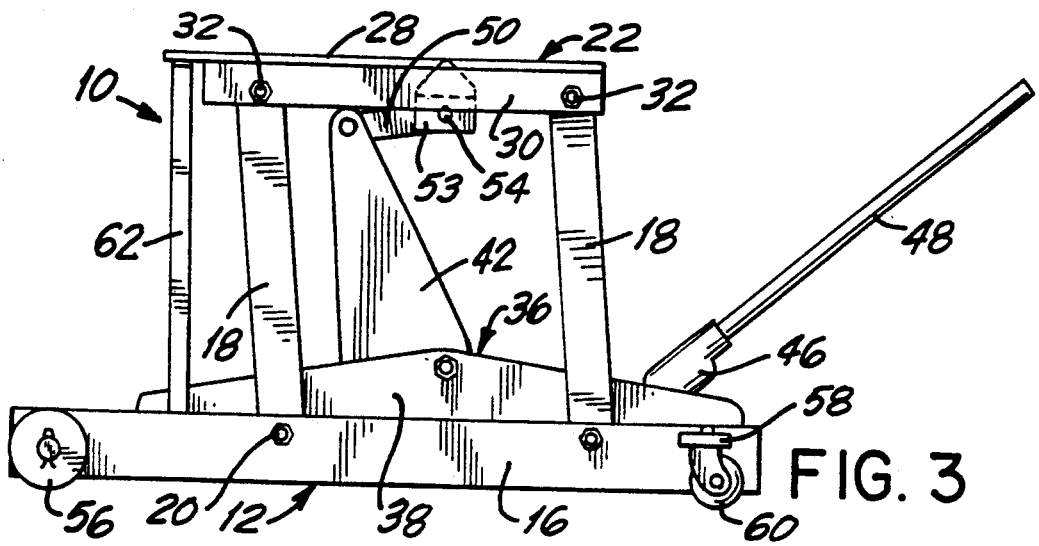
FIG. 3
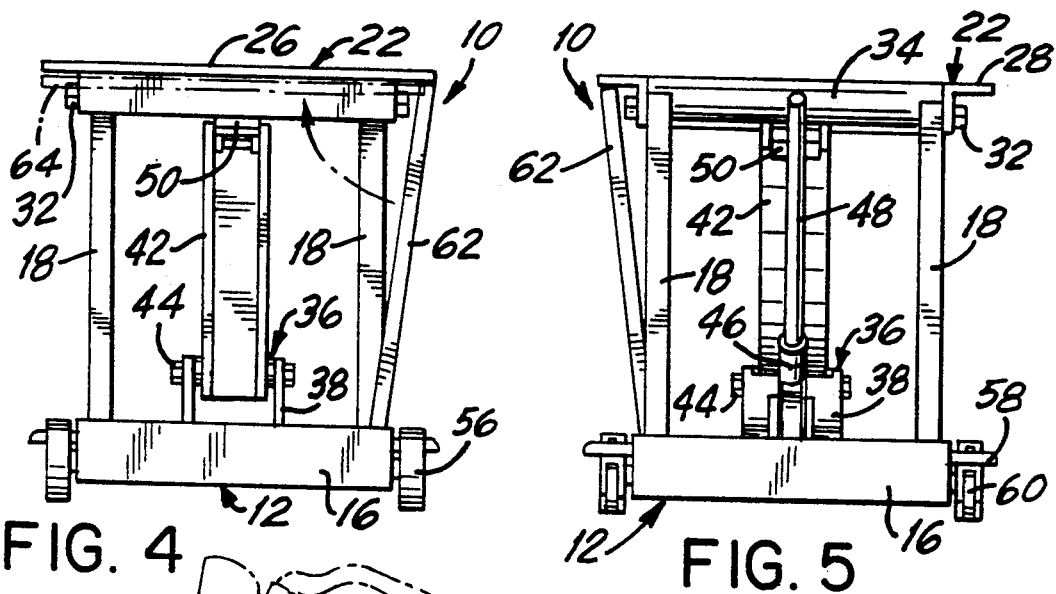
FIG. 4
FIG. 5
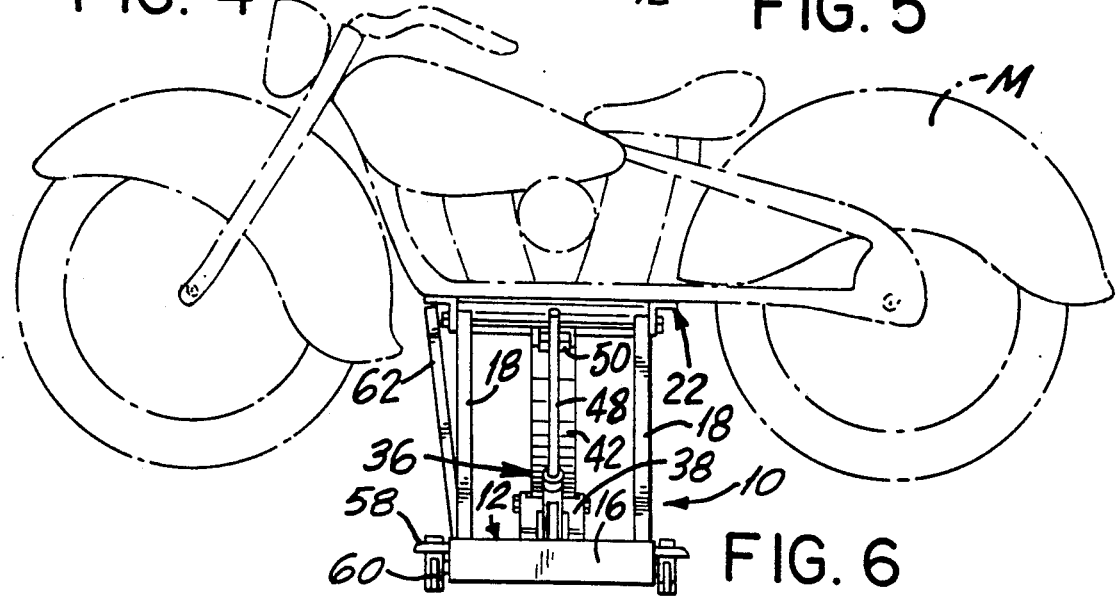
FIG. 6

VEHICLE JACK

BACKGROUND OF THE INVENTION

1. Field of the Invention

This invention relates generally to a vehicle jack and, in particular, to a jack for lifting a motorcycle.

2. Description of the Prior Art

It is often necessary, while repairing or servicing a motorcycle, to lift the motorcycle to a position in which both wheels are suspended. The jack devices which are known in the art are positioned underneath the central portion of the motorcycle and lift the motorcycle by the frame so that both wheels are suspended to perform the servicing operation.

One of such known jack devices consists of a plurality of horizontal members which are positioned orthogonally to the orientation of the motorcycle. These horizontal members are interconnected by pivotal support members such that when erect, the jack takes the form of a rectangular frame. One of the supporting members has a lever attached to it. This lever is positioned so that when the jack is in the erect position, the lever is substantially parallel to the motorcycle orientation. In order to operate this device, one must slide the collapsed jack underneath the motorcycle so that the horizontal members are positioned underneath the central portion of the motorcycle, and with the lever positioned substantially vertical. The operator must then steady the device with his foot and rotate the lever into a position which is substantially parallel to the motorcycle orientation. Rotating the lever causes the support members to pivot to raise the horizontal members thereby moving the jack to its erect position to lift the motorcycle so that both wheels are suspended. Such a device is available from Easyrider of Agoura Hills, Calif. under the names EZ-Lift and Duo-Lift.

This device has limited application because it only provides a single motorcycle lift height which is determined by the jack when in its erect position. In addition, this device does not provide sufficient safety measures to lock the jack in its erect position. Furthermore, lifting the motorcycle with this device requires substantial exertion on the part of the operator.

A second jack device known in the art consists of a base and a platform structure attached to the base by four pivotally connecting legs. A pneumatic cylinder is attached to the base. The pneumatic cylinder piston operates on at least one of the legs. In the collapsed position, the device is placed underneath the central portion of the motorcycle. The pneumatic cylinder is activated which pulls the legs to pivot them thereby lifting the platform structure into an upright position. Accordingly, lifting of the motorcycle is effected. A device of this kind is available from Camton Mechanical of Columbus, Ohio under the name Quicklift.

This device requires the application of a substantial amount of force to be applied in order to effect the pulling of the legs to effect the lifting.

The present invention minimizes the problems discussed with respect to the prior art and provides a vehicle jack which operates through a range of positions providing a stabilized jack which requires a relatively small amount of force to effect the lifting of the motorcycle.

SUMMARY OF THE INVENTION

The invention provides for a base, a lifting platform having a central cross member, pivotally connected legs which connect the lifting platform to the base, a standard hydraulic jack mounted on the base having a lifting member, and a pivot link connecting the lifting member of the jack with the cross member of the lifting platform. In use, the device in its collapsed position is placed underneath the central portion of the motorcycle. The jack is then activated to raise the lifting platform by producing a force on the pivoting link which is connected between the jack lifting member and the cross member of the lifting platform. A safety bar is provided which is disposed for pivotal movement to extend between the lifting platform and the base when the platform is raised thereby to hold the platform in such raised position regardless of action by the jack. The invention provides a stable, relatively inexpensive, jack device which effects lifting of the motorcycle with a relatively small amount of force.

BRIEF DESCRIPTION OF THE DRAWINGS

FIG. 3 is a side elevational view of the jack in the raised position shown in FIG. 1;

FIG. 4 is a front elevational view of the jack in the raised position shown in FIG. 1;

FIG. 5 is a rear elevational view of the jack in the raised position shown in FIG. 1; and FIG. 6 is a view similar to FIG. 5 with a motorcycle, in phantom, placed thereon.

DESCRIPTION OF THE PREFERRED EMBODIMENTS

Figure 1:
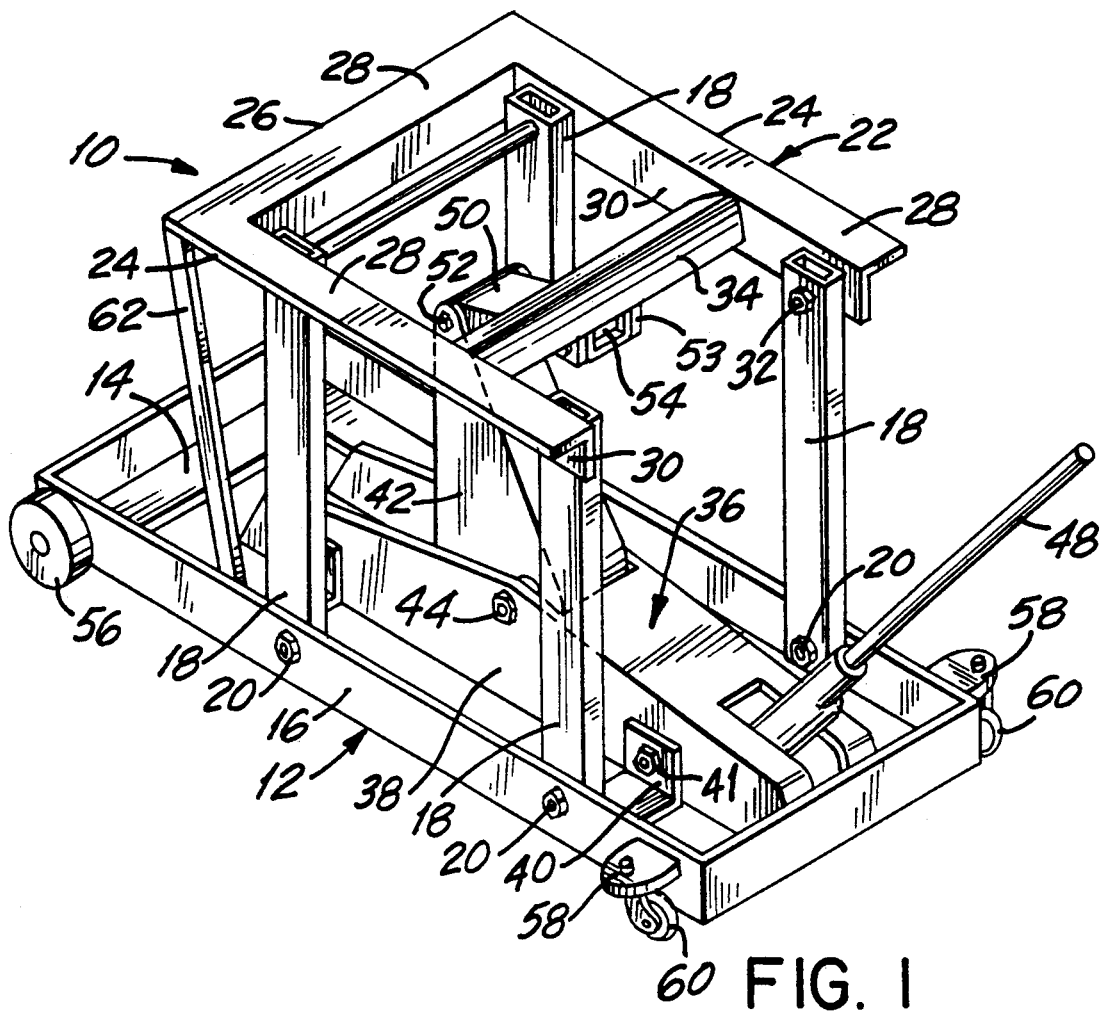
FIG. 1 is an elevational perspective view of the vehicle jack of the present invention in a raised position.

Referring to FIG. 1, numeral 10 represents a vehicle jack in a protracted elevated state constructed in accordance with the present invention. Jack 10 includes a base 12 preferably constructed of angle iron to define a frame having a flat or horizontal portion 14 and a raised or vertical portion 16. The lower end of four legs 18 are pivotally connected to vertical portions 16 by bolt fasteners 20. The arrangement is such that two of such legs 18 project upwardly from one side of base 12 and the other two legs 18 project upwardly from the opposite side of base 12. The upper ends of legs 18 are pivotally connected to a lifting platform represented generally by numeral 22.

Lifting platform 22 is constructed of angle iron to define a U-shaped frame formed by a pair of spaced-apart side members 24 interconnected at one end by an end member 26. Each of said side and end members 24, 26 is formed having a flat or horizontal portion 28 and a depending vertical portion 30. The upper ends of legs 18 are pivotally connected to the vertical portions 30 by bolt fasteners 32. The top face of horizontal portions 28 may include a non-skid substance to prevent slipping of the vehicle being lifted by the platform. Lifting platform 22 has a cross beam member 34 extending between and interconnecting side members 24 at a position between end member 26 and the free ends of said side members. Cross beam member 34 serves to connect lifting platform 22 to a jack component 36 as hereinafter described.

Figure 2:
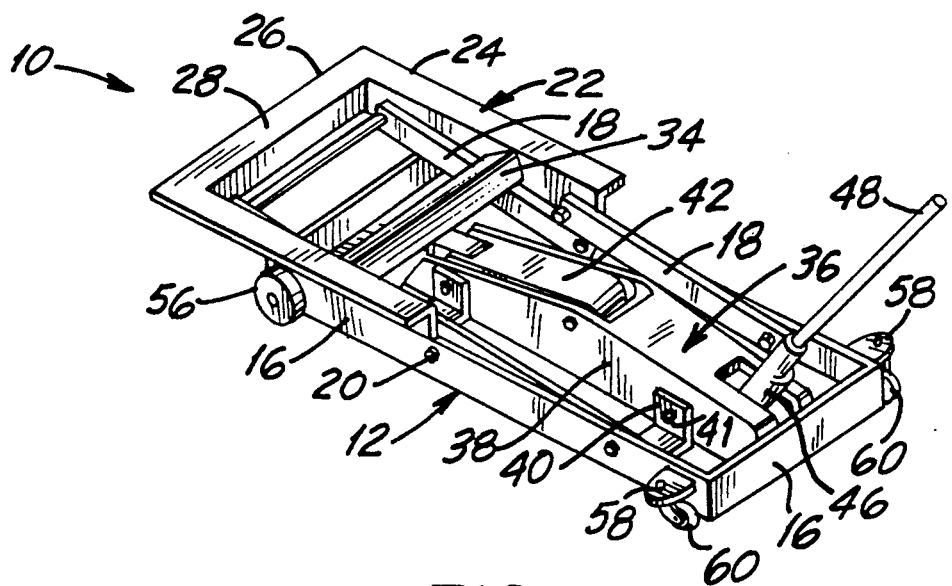
FIG. 2 is an elevational perspective view of the vehicle jack of the present invention in its collapsed position.

Jack component 36 preferably is of the hydraulic type and operates in a manner well known in the art. The jack component includes a housing 38 which is mounted to base 12 using brackets 40 and is secured in place by bolt fasteners 41 or the like. Jack component 36 also includes an active or lifting member 42 pivotally mounted to housing 38 through pivot pin 44, a handle receptacle 46, and a handle 48. Lifting member 42 is disposed for movement between a retracted or lowered position, as shown in FIG. 2, and a protracted or raised position, as shown in FIG. 1. Lifting member is raised by pumping handle 28 in a manner known in the art.

The free end of lifting member 42 is pivotally connected to one end of a pivot link 50 through pivot pin 52. The other end of link 50 is pivotally connected to the undersurface of cross beam member 34 by means of brackets 53 and pivot pin 54. When lifting member 42 is in its retracted position, the lifting platform 22 is in a low profile state by the action of pivot link 50. In the opposite configuration, when lifting member 42 is in its protracted position, lifting platform 22 is in an elevated state.

For ease in moving or rolling jack 10, fixed direction wheels 56 are affixed to the sides of vertical portions 16 of base 12 adjacent the front end of the jack. Affixed to the sides of vertical portions 16 adjacent the rear end of the jack are outwardly projecting stems 58 to which are mounted multi-direction wheels 60.

In operation, jack 10 is positioned beneath the central portion of the motorcycle "M" shown in phantom in FIG. 6. Upon pumping handle 48, lifting member 42 raises thereby effecting rotation of pivot link 50 and the lifting of platform 22, together with the motorcycle M supported thereon, to a height where both wheels of the motorcycle are suspended.

As a safety feature, a bar 62 is provided having one end pivotally connected to the depending vertical portion 30 of platform end member 26. Bar 62 is disposed for pivotal movement from a horizontal position parallel to platform end member 26, shown in phantom in FIG. 4, to a depending vertical position, as shown in FIGS. 1 and 3-6, thereby to permit the free end 64 thereof to engage with the horizontal portion 14 of base 12 when in use. Safety bar 62 serves to maintain or hold platform 22 in its elevated state regardless of action by hydraulic jack component 36. Alternatively, the connection of bar 62 could be altered so as to pivotally connect one end to a portion of base 12, and then one can lift or raise the free end to engage an undersurface of platform 22 when in use.

In traversing the range of positions indicated by FIGS. 1 and 2, respectively, pivot link 50 rotates approximately 180 degrees. Accordingly, the side of pivot link 50 which faces upward in FIG. 2 is caused to pivot and now faces downward in FIG. 1. The rotation of pivot link 50 by approximately 180 degrees accommodates the change in distance between the pivot point 52 of lifting member 42 and cross member 34. In addition, pivot link 50 serves to maintain the lifting surface of lifting platform 22 horizontal throughout the range of positions between those illustrated in FIGS. 1 and 2. Accordingly, a motorcycle may be lifted to a substantial number of different heights.

While a preferred embodiment of the invention has been shown and described in detail, it will be readily understood and appreciated that numerous omissions, changes, and additions may be made without departing from the spirit and scope of the claimed invention.

What is claimed is:

1. A motorcycle jack comprising:
a base,
a lifting platform,
a plurality of legs, each of said legs having a first end pivotally mounted to said base and a second end pivotally mounted to said lifting platform,
a hydraulic jack component mounted on said base, said hydraulic jack component having an active lifting member mounted therein for movement between a retracted position and a protracted position, said active lifting member having an outboard end,
a pivot link having a first end pivotally mounted to said lifting platform and having a second end pivotally mounted to said outboard end of said active member of said hydraulic component,
said active member of said hydraulic component when in said retracted position holding said pivot link and said lifting platform in a retracted low profile state, and
said active member of said hydraulic component when in said protracted position holding said pivot link and said lifting platform in a protracted elevated state,
said pivot link pivoting substantially 180 degrees about said first end during motion of said lifting platform between said low profile state and said protracted elevated state,
whereby a motorcycle placed over said lifting platform when in said low profile state will be raised by said platform when said active member of said hydraulic component is moved into said protracted position.

2. The motorcycle jack of claim 1 wherein:
said lifting platform is substantially horizontal in said retracted low profile state, in said protracted elevated state, and all positions in-between said states.

3. The motorcycle jack of claim 2 further comprising:
a safety bar having a first end pivotally connected to either said lifting platform or said base and having a second free end, said safety bar being positioned and having a length that when said platform is in said protracted elevated state, said safety bar can be pivoted to hold said platform in its elevated state regardless of action by said hydraulic jack component.

4. The motorcycle jack of claim 1 wherein;
said plurality of legs is four in number.

5. The motorcycle jack of claim 1 further comprising:
a safety bar having a first end pivotally connected to either said lifting platform or said base and having a second free end, said safety bar being positioned and having a length that when said platform, is in said protracted elevated state, said safety bar can be pivoted to hold said platform in its elevated state regardless of action by said hydraulic jack component.

6. The motorcycle jack of claim 1 wherein:
said lifting platform has a cross member, said first end of said pivot link being pivotally mounted to said cross member.

7. The motorcycle jack of claim further comprising:
a plurality of wheels mounted to said base for ease in rolling said jack.

8. A motorcycle jack comprising:
a base,
a lifting platform, said platform having a cross member, a plurality of legs, each of said legs having a first end pivotally mounted to said base and a second end pivotally mounted to said lifting platform, a hydraulic jack component mounted on said base, said hydraulic component having an active lifting member mounted therein for movement between a retracted position and a protracted position, said active lifting member having an outboard end, a pivot link having a first end pivotally mounted to said cross member of said lifting platform and having a second end pivotally mounted to said outboard end of said active member of said hydraulic component, said active member of said hydraulic component when in said retracted position holding said pivot link and said lifting platform in a retracted low profile state, said active member of said hydraulic component when in said protracted position holding said pivot link and said lifting platform in a protracted elevated state, said pivot link disposed to pivot substantially 180 degrees about said first end during motion of said lifting platform between said low profile state and said protracted elevated state, said lifting platform being substantially horizontal in said retracted low profile state, in said protracted elevated state, and all positions in-between said states, and a safety bar having a first end pivotally connected to either said lifting platform or said base and having a second free end, said safety bar being positioned and having a length that when said platform is in said protracted elevated state, said safety bar can be pivoted to hold said platform in its elevated state regardless of action by said hydraulic jack component, whereby a motorcycle placed over said lifting platform when in said low profile state will be raised by said platform when said active member of said hydraulic component is moved into said protracted position.

9. The motorcycle jack of claim 8 wherein:
said plurality of legs is four in number.

10. The motorcycle jack of claim further comprising:
a plurality of wheels mounted to said base for ease in rolling said jack.

11. A motorcycle jack comprising:
a base,
a lifting platform,
a plurality of legs, each of said legs having a first end pivotally mounted to said base and a second end pivotally mounted to said lifting platform,
a hydraulic jack component mounted on said base, said hydraulic component having an active lifting member mounted therein for movement between a retracted position and a protracted position, said active lifting member having an outboard end,
a pivot link having a first end pivotally mounted to said lifting platform and having a second end pivotally mounted to said outboard end of said active member of said hydraulic component,
said active member of said hydraulic component when in said retracted position holding said pivot link and said lifting platform in a retracted low profile state, and
said active member of said hydraulic component when in said protracted position holding said pivot link and said lifting platform in a protracted elevated state, said pivot link being rotated from a first substantially horizontal position to a second substantially horizontal position during motion of said lifting platform between said low profile state and said protracted elevated state, whereby a motorcycle placed over said lifting platform when in said low profile state will be raised by said platform when said active member of said hydraulic component is moved into said protracted position.

12. A motorcycle jack of claim 1 wherein:
said lifting platform is substantially horizontal in said retracted low profile state, in said protracted elevated state and all positions in-between said states.

13. The motorcycle jack of claim 12 wherein:
said plurality of legs is four in number.

14. The motorcycle jack of claim 13 further comprising:
a safety bar having a first end pivotally connected to either said lifting platform or said base and having a second free end, said safety bar being positioned and having a length that when said platform is in said protracted elevated state, said safety bar can be pivoted to hold said platform in its elevated state regardless of action by said hydraulic jack component.

15. The motorcycle jack of claim 11 wherein:
said lifting platform has a cross member, said first end of said pivot link being pivotally mounted to said cross member.

16. The motorcycle jack of claim 11 further comprising:
a plurality of wheels mounted to said base for ease in rolling said jack.

17. A motorcycle jack comprising:
a base,
a lifting platform,
a plurality of legs, each of said legs having a first end pivotally mounted to said base and a second end pivotally mounted to said lifting platform,
a hydraulic jack component mounted on said base, said hydraulic component having an active lifting member mounted therein for movement between a retracted position and a protracted position, said active lifting member having one end pivotally mounted to said jack component at a location defining a first end point of said jack and having an outboard end,
a pivot link having a first end pivotally mounted to the outboard end of said active member of said hydraulic component and having a second end pivotally mounted to said lifting platform at a location defining a second end point of said jack,
said active member of said hydraulic component when in said retracted position holding said pivot link and said lifting platform in a retracted low profile state, and
said active member of said hydraulic component when in said protracted position holding said pivot link and said lifting platform in a protracted elevated state,
the distance between said first end point and said second end point of said jack being of a predetermined length when said active member is in its protracted position and said pivot link and said lifting platform are in their protracted elevated state, and wherein said distance between said first and said second end points is greater than said predetermined length when said active member is in its retracted position and said pivot link and said lifting platform are in their retracted low profile state, whereby a motorcycle placed over said lifting platform when in said low profile state will be raised by said platform when said active member of said hydraulic component is moved into said protracted position.

* * * * *